(12) United States Patent
Johnson

(10) Patent No.: US 12,037,932 B2
(45) Date of Patent: Jul. 16, 2024

(54) EXHAUST GAS AFTERTREATMENT SYSTEM

(71) Applicant: Cummins Emission Solutions Inc., Columbus, IN (US)

(72) Inventor: Ryan M. Johnson, Cottage Grove, WI (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 18/278,061

(22) PCT Filed: Feb. 21, 2022

(86) PCT No.: PCT/US2022/017167
§ 371 (c)(1),
(2) Date: Aug. 21, 2023

(87) PCT Pub. No.: WO2022/178359
PCT Pub. Date: Aug. 25, 2022

(65) Prior Publication Data
US 2024/0125263 A1    Apr. 18, 2024

Related U.S. Application Data

(60) Provisional application No. 63/152,138, filed on Feb. 22, 2021.

(51) Int. Cl.
*F01N 13/00*        (2010.01)
*F01N 3/035*        (2006.01)
(Continued)

(52) U.S. Cl.
CPC ........... *F01N 3/2066* (2013.01); *F01N 3/035* (2013.01); *F01N 3/2013* (2013.01);
(Continued)

(58) Field of Classification Search
CPC .... F01N 3/2066; F01N 3/208; F01N 13/0093; F01N 13/0097; F01N 13/017; F01N 2470/22; F01N 2610/02
See application file for complete search history.

(56) References Cited

U.S. PATENT DOCUMENTS 8,549,844 B2 * 10/2013 Huethwohl ............. F01N 1/084
60/301
10,273,854 B1 * 4/2019 Abbassi ............ B01F 25/31331
(Continued)

FOREIGN PATENT DOCUMENTS

EP      3 670 856 A1     6/2020
ES      2775776 T3 *     7/2020 ........... F01N 13/009
(Continued)

OTHER PUBLICATIONS

International Search Report and Written Opinion in PCT Application No. PCT/US2022/017167 issued May 18, 2022.

*Primary Examiner* — Jonathan R Matthias
(74) *Attorney, Agent, or Firm* — Foley & Lardner LLP

(57) ABSTRACT

An exhaust gas aftertreatment system includes a first decomposition chamber, a first dosing module, a first conversion catalyst member, a second decomposition chamber, a second dosing module, a second conversion catalyst member, and a third conversion catalyst member. The first decomposition chamber is configured to receive an exhaust gas. The first dosing module is coupled to the first decomposition chamber and configured to provide a first treatment fluid into the first decomposition chamber. The first conversion catalyst member is configured to receive a mixture of the first treatment fluid and the exhaust gas, from the first decomposition chamber. The second decomposition chamber is configured to receive the exhaust gas from the first conversion catalyst member. The second dosing module is coupled to the second decomposition chamber and configured to provide a second treatment fluid into the second decomposition chamber.

21 Claims, 5 Drawing Sheets

(51) Int. Cl.
  *F01N 3/20*   (2006.01)
  *F01N 3/28*   (2006.01)
(52) U.S. Cl.
  CPC ....... *F01N 3/2892* (2013.01); *F01N 13/0097* (2014.06); *F01N 13/0093* (2014.06); *F01N 2240/16* (2013.01); *F01N 2610/02* (2013.01); *F01N 2610/08* (2013.01)

(56) References Cited

U.S. PATENT DOCUMENTS

| | | | |
|---|---|---|---|
| 2005/0034450 A1 | 2/2005 | Kazuhiro et al. | |
| 2006/0153748 A1* | 7/2006 | Huthwohl | F01N 13/017 422/168 |
| 2006/0156712 A1* | 7/2006 | Buhmann | F01N 3/2885 60/297 |
| 2008/0314033 A1* | 12/2008 | Aneja | F01N 3/033 60/299 |
| 2010/0319320 A1 | 12/2010 | Mital et al. | |
| 2011/0146253 A1 | 6/2011 | Isada et al. | |
| 2015/0023854 A1 | 1/2015 | Lim et al. | |
| 2015/0113961 A1 | 4/2015 | De Ojeda et al. | |

FOREIGN PATENT DOCUMENTS

| | | | | |
|---|---|---|---|---|
| FR | 3083821 A1 | 1/2020 | | |
| WO | WO-2018082379 A1 * | 5/2018 | ............... | F01N 3/28 |
| WO | WO-2020/072152 A1 | 4/2020 | | |
| WO | WO-2020/248087 A1 | 12/2020 | | |

* cited by examiner

EXHAUST GAS AFTERTREATMENT SYSTEM

CROSS-REFERENCE TO RELATED PATENT APPLICATION

This Application is a National Phase of PCT/US2022/017167, filed Feb. 21, 2022, which claims the benefit of U.S. Provisional Patent Application No. 63/152,138, filed Feb. 22, 2021. The contents of these applications are incorporated herein by reference.

TECHNICAL FIELD

The present disclosure relates generally to an exhaust gas aftertreatment system for an internal combustion engine.

BACKGROUND

For an internal combustion engine system, it may be desirable to treat exhaust gas produced by a combustion of fuel by an internal combustion engine so as to reduce emissions of undesirable components in the exhaust gas. The exhaust gas can be treated using an aftertreatment system. One approach that can be implemented in an aftertreatment system is to pass the exhaust gas through an aftertreatment component.

In order to enhance reduction of emissions of the undesirable components, it may be desirable to route the exhaust gas through the aftertreatment system in two or more flow paths concurrently. However, this routing often significantly increases a space claim of the aftertreatment system. Thus, it can be difficult or impossible in some applications to route the exhaust gas through an aftertreatment system in two or more flow paths concurrently.

SUMMARY

In one embodiment, an exhaust gas aftertreatment system includes a first decomposition chamber, a first dosing module, a first conversion catalyst member, a second decomposition chamber, a second dosing module, a second conversion catalyst member, and a third conversion catalyst member. The first decomposition chamber is configured to receive an exhaust gas. The first dosing module is coupled to the first decomposition chamber and configured to provide a first treatment fluid into the first decomposition chamber. The first conversion catalyst member is configured to receive a mixture of the first treatment fluid and the exhaust gas, from the first decomposition chamber. The second decomposition chamber is configured to receive the exhaust gas from the first conversion catalyst member. The second dosing module is coupled to the second decomposition chamber and configured to provide a second treatment fluid into the second decomposition chamber. The second conversion catalyst member is configured to receive a first portion of a mixture of the second treatment fluid and the exhaust gas, from the second decomposition chamber. The third conversion catalyst member is configured to receive a second portion of the mixture of the second treatment fluid and the exhaust gas, from the second decomposition chamber.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

Figure 1:
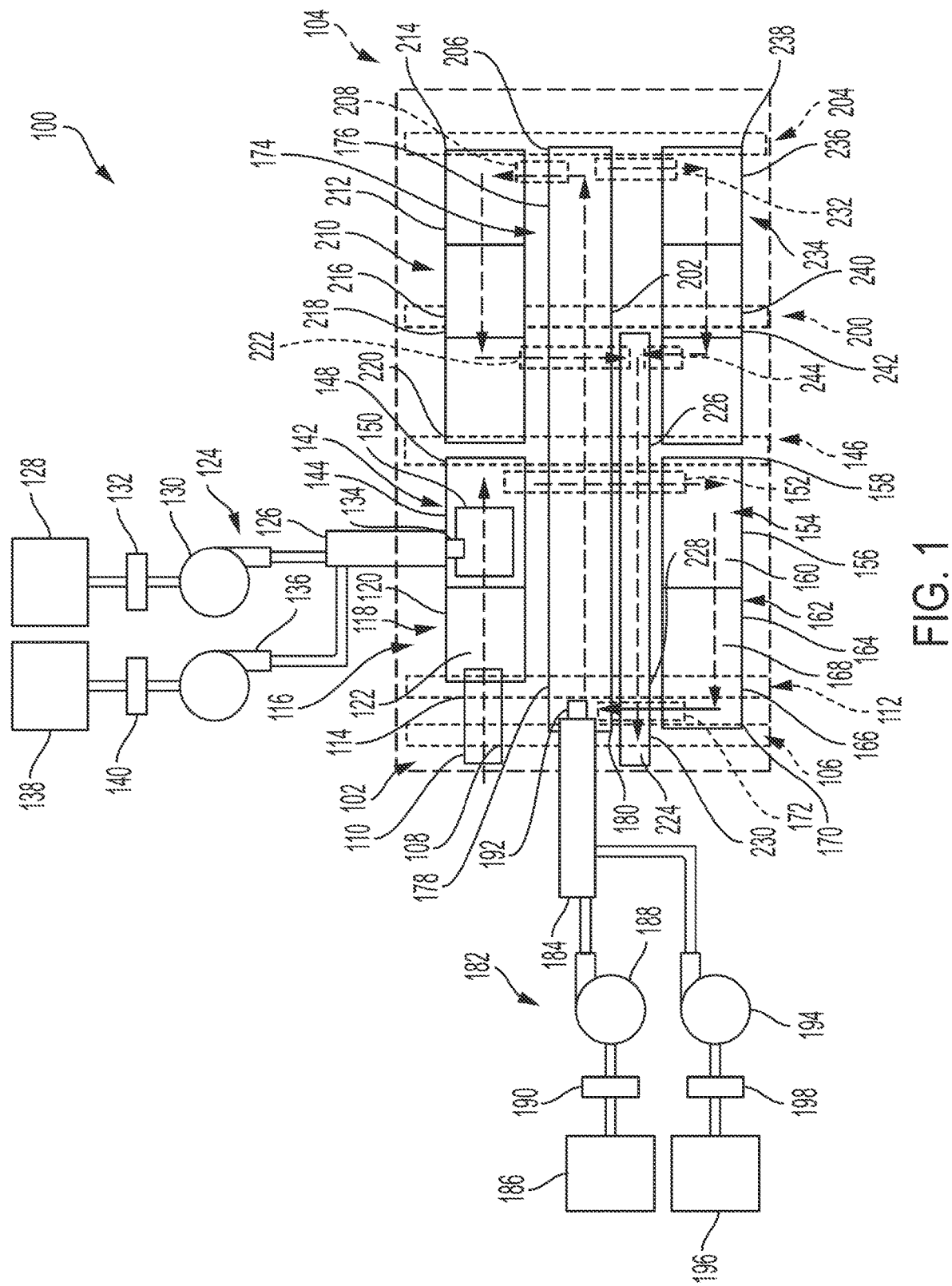
FIG. 1 is a schematic diagram of an example exhaust gas aftertreatment system including a housing assembly.
Figure 2:
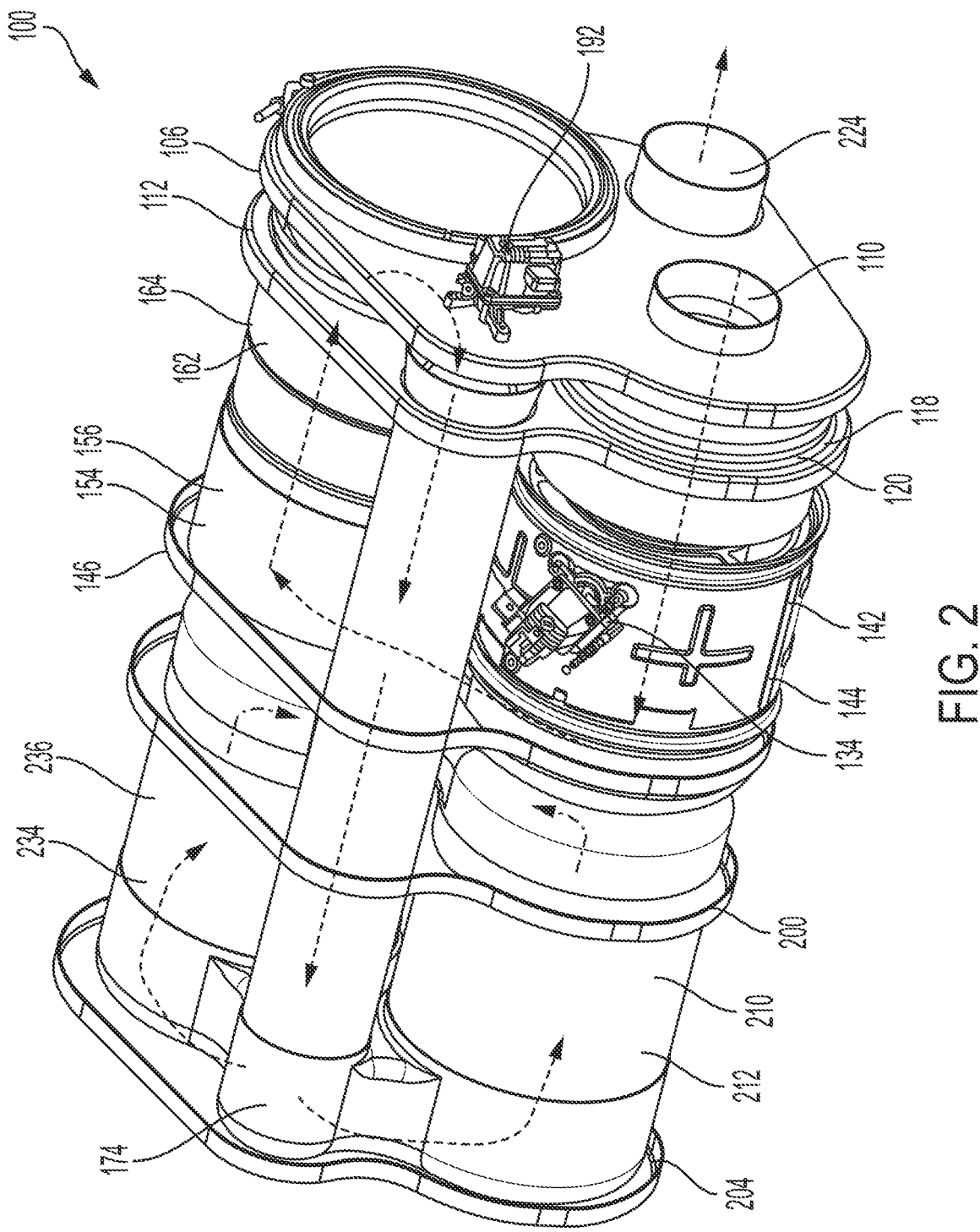
FIG. 2 is a perspective view of the exhaust gas aftertreatment system shown in FIG. 1.
Figure 3:
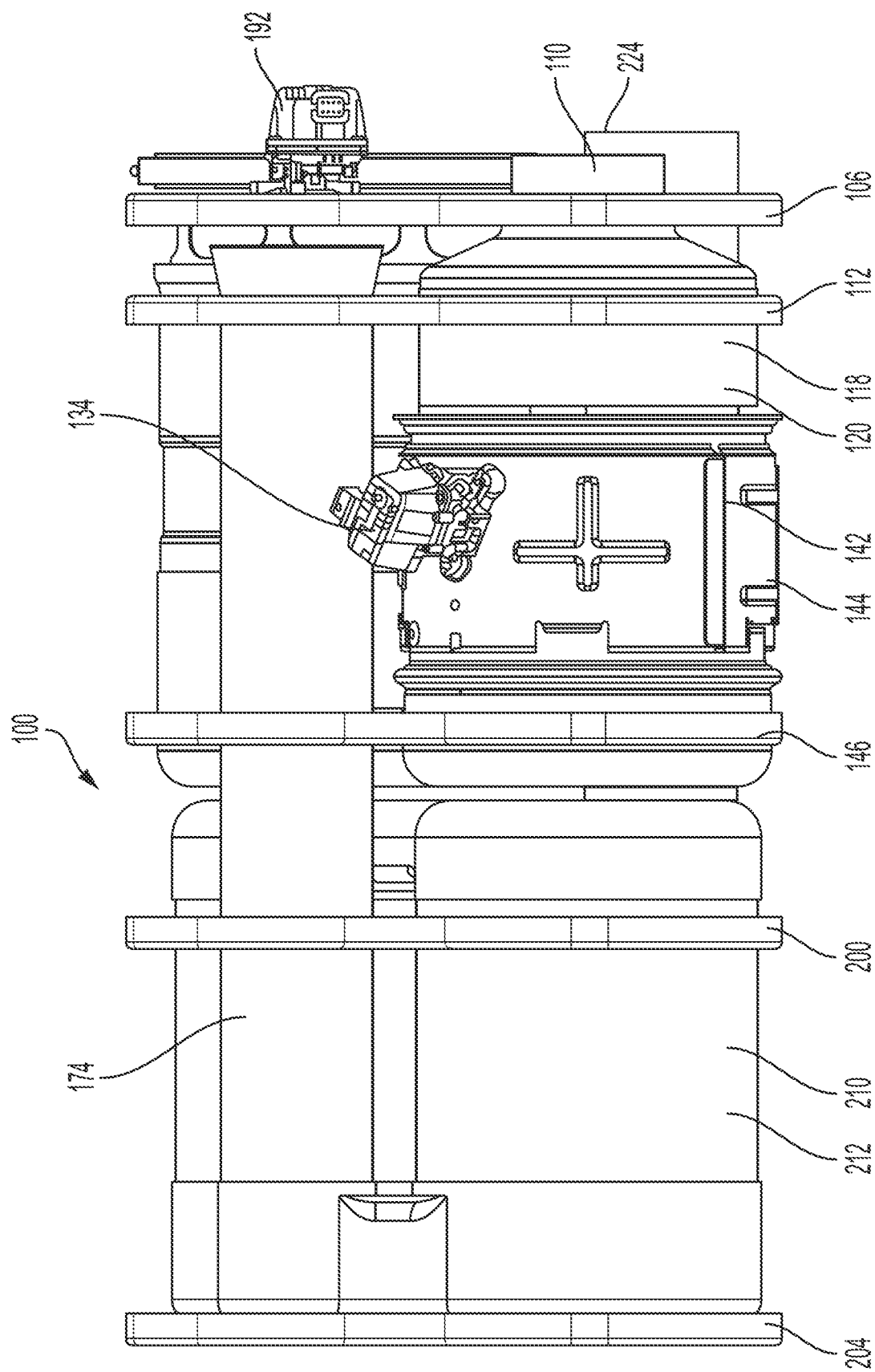
FIG. 3 is a side view of the exhaust gas aftertreatment system shown in FIG. 1.
Figure 4:
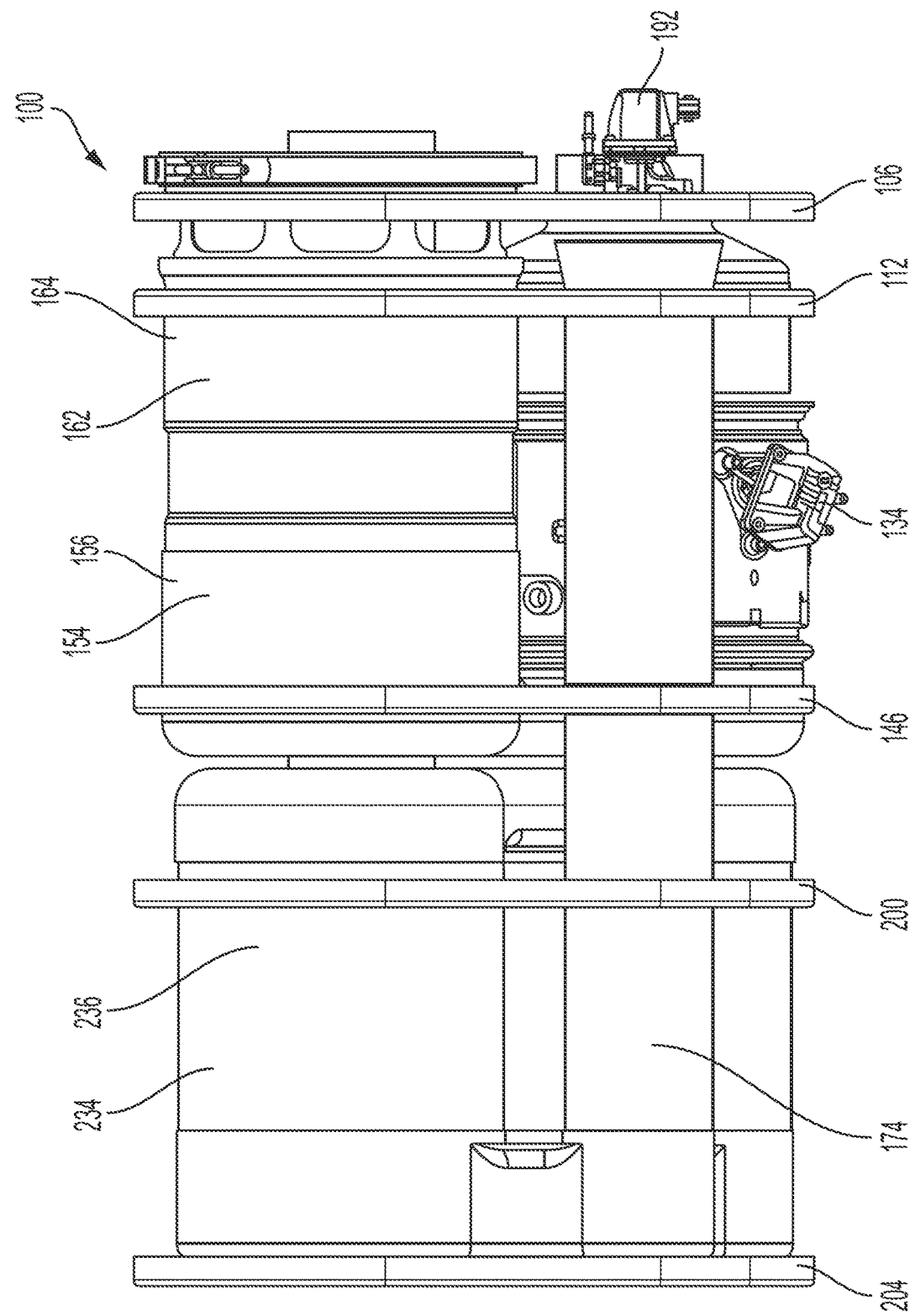
FIG. 4 is another side view of the exhaust gas aftertreatment system shown in FIG. 1.
Figure 5:
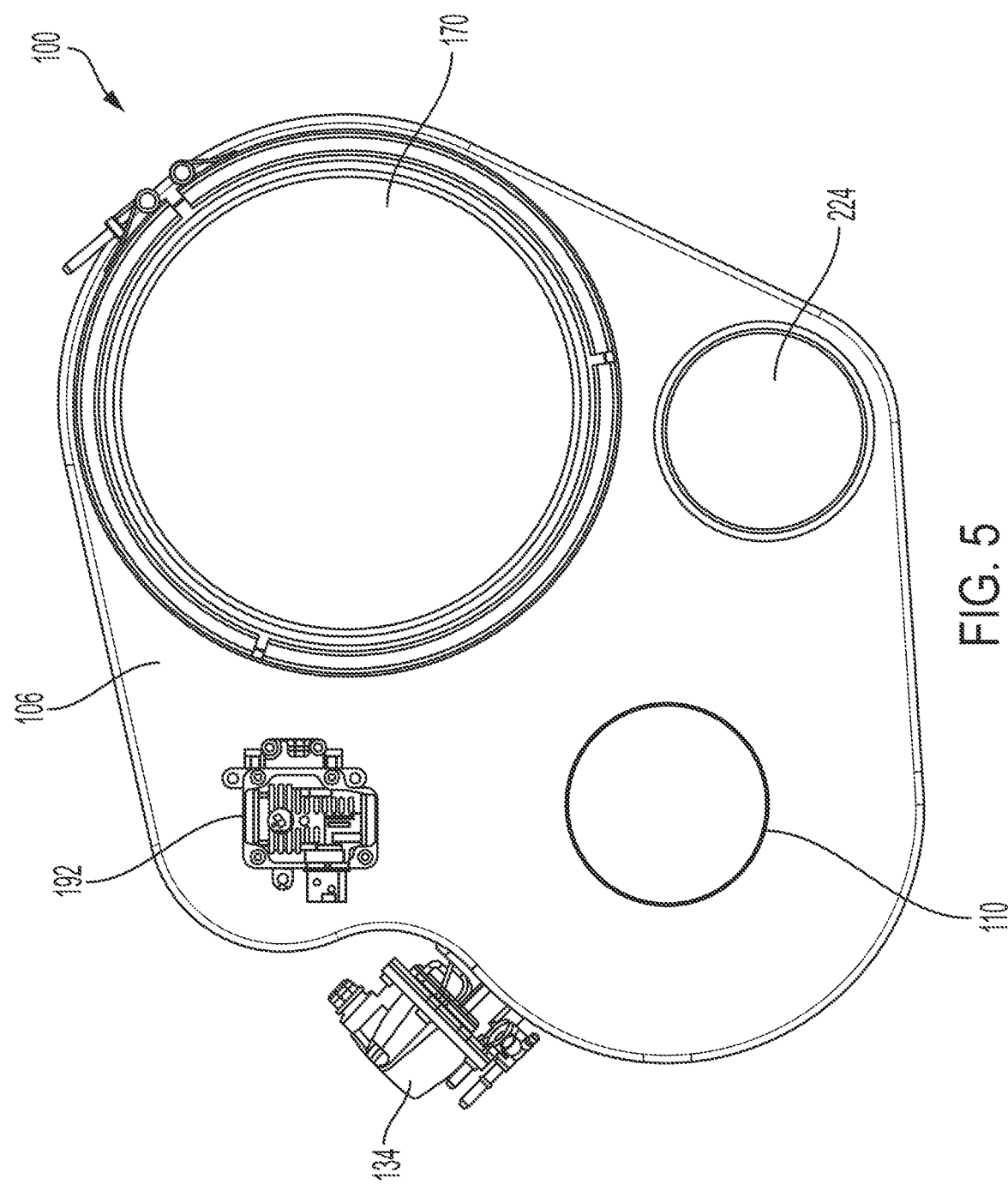
FIG. 5 is a front view of the exhaust gas aftertreatment system shown in FIG. 1.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing an exhaust gas aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. OVERVIEW

In order to reduce emissions, it may be desirable to treat exhaust gas using an aftertreatment system that includes at least one aftertreatment component. However, in certain space constraints, it may be desirable to route the exhaust gas through the aftertreatment system in two or more flow paths concurrently. However, it may be undesirable to do so in some situations. For example, such systems are often relatively large and therefore cannot be utilized in applications with certain space claim constraints. These systems are often relatively large so as to enable desirable mixing of urea and exhaust gas.

Implementations herein are directed to an exhaust gas aftertreatment system that includes two treatment fluid delivery systems, two decomposition chambers, and multiple aftertreatment component substrates, such as conversion catalyst members, which facilitate treatment of the exhaust gas in two flow paths in parallel. The exhaust gas aftertreatment system includes a housing assembly with a plurality of housing panels which facilitate mounting of the various components in this arrangement.

Not only does the arrangement utilized by the exhaust gas aftertreatment system described herein increase an efficiency of treating the exhaust gas, but this arrangement also harvests heat of the exhaust gas to heat multiple components of the exhaust gas aftertreatment system. For example, exhaust gas flowing through the second decomposition chamber heats multiple aftertreatment component substrates. As a result, the exhaust gas aftertreatment system is capable of attaining a 'light-off' temperature (e.g., a temperature at which the exhaust gas aftertreatment system is capable of desirably treating the exhaust gas, etc.) in a significantly shorter amount of time than other systems.

II. OVERVIEW OF EXAMPLE EXHAUST GAS AFTERTREATMENT SYSTEMS

FIGS. 1-5 depict an exhaust gas aftertreatment system 100 (e.g., treatment system, etc.) for treating exhaust gas produced by an internal combustion engine (e.g., diesel internal combustion engine, gasoline internal combustion engine, hybrid internal combustion engine, propane internal combustion engine, dual-fuel internal combustion engine, etc.). The exhaust gas aftertreatment system 100 includes an exhaust gas conduit system 102 (e.g., line system, pipe system, etc.). The exhaust gas conduit system 102 is configured to facilitate routing of the exhaust gas produced by the internal combustion engine throughout the exhaust gas aftertreatment system 100 and to atmosphere (e.g., ambient environment, etc.).

The exhaust gas aftertreatment system 100 also includes a housing assembly 104 (e.g., body assembly, etc.). As is explained in more detail herein, the housing assembly 104 is configured to facilitate treatment of the exhaust gas. This treatment may facilitate reduction of emission of undesirable components (e.g., nitrogen oxides ($NO_x$), etc.) in the exhaust gas. This treatment may also or instead facilitate conversion of various oxidation components (e.g., carbon monoxide (CO), hydrocarbons, etc.) of the exhaust gas into other components (e.g., carbon dioxide ($CO_2$), water vapor, etc.). This treatment may also or instead facilitate removal of particulates (e.g., soot, particulate matter, etc.) from the exhaust gas.

The housing assembly 104 includes a first housing panel 106 (e.g., platform, plate, flange, etc.). As is explained in more detail herein, the first housing panel 106 is configured to support various components of the exhaust gas aftertreatment system 100 (e.g., on a frame of a vehicle having the exhaust gas aftertreatment system 100, etc.). The first housing panel 106 includes a first housing panel inlet aperture 108 (e.g., hole, window, opening, etc.). As is explained in more detail herein, the first housing panel inlet aperture 108 facilitates flow of the exhaust gas through the first housing panel 106.

The exhaust gas conduit system 102 includes an inlet exhaust gas conduit 110 (e.g., line, pipe, etc.). The inlet exhaust gas conduit 110 is fluidly coupled to an upstream component (e.g., header on the internal combustion engine, exhaust manifold on the internal combustion engine, the internal combustion engine, etc.) and is configured to receive exhaust gas from the upstream component. In some embodiments, the inlet exhaust gas conduit 110 is coupled (e.g., attached, fixed, welded, fastened, riveted, adhesively attached, bonded, pinned, etc.) to the upstream component. In other embodiments, the inlet exhaust gas conduit 110 is integrally formed with the upstream component.

The inlet exhaust gas conduit 110 extends through the first housing panel inlet aperture 108. In this way, the first housing panel 106 supports the inlet exhaust gas conduit 110 (e.g., relative to a frame that the first housing panel 106 is coupled to, etc.) and the inlet exhaust gas conduit 110 facilitates passage of the exhaust gas through the first housing panel 106. In various embodiments, the inlet exhaust gas conduit 110 is coupled to the first housing panel 106 (e.g., at least partially around the first housing panel inlet aperture 108, etc.).

The housing assembly 104 also includes a second housing panel 112 (e.g., platform, plate, flange, etc.). As is explained in more detail herein, the second housing panel 112 is configured to support various components of the exhaust gas aftertreatment system 100 (e.g., on a frame of a vehicle having the exhaust gas aftertreatment system 100, etc.). The second housing panel 112 includes a second housing panel inlet aperture (e.g., hole, window, opening, etc.).

The inlet exhaust gas conduit 110 also extends through the second housing panel inlet aperture 114. In this way, the second housing panel 112 supports the inlet exhaust gas conduit 110 (e.g., relative to a frame that the second housing panel 112 is coupled to, etc.) and the inlet exhaust gas conduit 110 facilitates passage of the exhaust gas through the second housing panel 112. In various embodiments, the inlet exhaust gas conduit 110 is coupled to the second housing panel 112 (e.g., at least partially around the second housing panel inlet aperture 114, etc.).

In various embodiments, the exhaust gas aftertreatment system 100 includes a heater (e.g., electric heater, resistance heater, etc.). The heater is positioned within the inlet exhaust gas conduit 110 and is configured to heat the exhaust gas flowing through the inlet exhaust gas conduit 110. The heater may be controlled to cause heating of the exhaust gas (e.g., during a warm-up period of an internal combustion engine having the exhaust gas aftertreatment system 100, etc.), so as to facilitate desirable reduction of undesirable components in the exhaust gas. This may cause a temperature of the exhaust gas to be increased (e.g., to facilitate regeneration of components of the exhaust gas aftertreatment system 100, etc.).

In various embodiments, the exhaust gas aftertreatment system 100 includes a hydrocarbon dosing system that is configured to dose a hydrocarbon (e.g., fuel, oil, additive, etc.) into the exhaust gas flowing within the inlet exhaust gas conduit 110. This may cause a temperature of the exhaust gas to be increased (e.g., to facilitate regeneration of components of the exhaust gas aftertreatment system 100, etc.). For example, the temperature of the exhaust gas may be increased by combusting the hydrocarbon within the exhaust gas (e.g., using a spark plug, etc.).

The housing assembly 104 also includes an introduction housing 116 (e.g., decomposition housing, hydrocarbon introduction housing, etc.). The introduction housing 116 is fluidly coupled to the inlet exhaust gas conduit 110 and is configured to receive exhaust gas from the inlet exhaust gas conduit 110. In various embodiments, the introduction housing 116 is coupled to the inlet exhaust gas conduit 110. For example, the introduction housing 116 may be fastened (e.g., using a band, using bolts, using twist-lock fasteners, threaded, etc.), welded, riveted, or otherwise attached to the inlet exhaust gas conduit 110. In other embodiments, the introduction housing 116 is integrally formed with the inlet exhaust gas conduit 110. As utilized herein, the terms "fastened," "fastening," and the like describe attachment (e.g., joining, etc.) of two structures in such a way that detachment (e.g., separation, etc.) of the two structures remains possible while "fastened" or after the "fastening" is completed, without destroying or damaging either or both of the two structures.

As is explained in more detail herein, the introduction housing 116 is configured to facilitate introduction of a treatment fluid, such as a reductant (e.g., diesel exhaust fluid (DEF), Adblue®, a urea-water solution (UWS), an aqueous urea solution, AUS32, etc.) or a hydrocarbon, into the exhaust gas. When the reductant is introduced into the exhaust gas, reduction of emission of undesirable components (e.g., nitrogen oxides ($NO_x$), etc.) in the exhaust gas may be facilitated. When the hydrocarbon is introduced into the exhaust gas, the temperature of the exhaust gas may be increased (e.g., to facilitate regeneration of components of the exhaust gas aftertreatment system 100, etc.). For example, the temperature of the exhaust gas may be increased by combusting the hydrocarbon within the exhaust gas (e.g., using a spark plug, etc.).

The introduction housing 116 also includes a first aftertreatment component 118 (e.g., exhaust gas aftertreatment component, aftertreatment module, etc.). The first aftertreatment component 118 includes a first casing 120 (e.g., housing, shell, body, etc.). The first casing 120 is positioned within the introduction housing 116 (e.g., using a gasket, using a spacer, using a seal, etc.) such the exhaust gas flows from the inlet exhaust gas conduit 110 to the first aftertreatment component 118.

The first aftertreatment component 118 also includes a first aftertreatment component substrate 122 (e.g., working member, etc.). The first aftertreatment component substrate 122 is positioned within the first casing 120. For example, the first aftertreatment component substrate 122 may be coupled to the first casing 120. The first aftertreatment component substrate 122 receives the exhaust gas from the first casing 120 (e.g., from an inlet of the first casing 120, etc.) and provides the first portion of the exhaust gas to the first casing 120 (e.g., to an outlet of the first casing 120, etc.). The first aftertreatment component substrate 122 is configured to facilitate treatment of the exhaust gas. This treatment may facilitate reduction of emission of the undesirable components in the exhaust gas. This treatment may also or instead facilitate conversion of various oxidation components of the exhaust gas into other components. This treatment may also or instead facilitate removal of particulates from the exhaust gas.

In various embodiments, the first aftertreatment component substrate 122 includes an oxidation catalyst member (e.g., a diesel oxidation catalyst (DOC), etc.). In these embodiments, the first aftertreatment component substrate 122 is configured to oxidize a hydrocarbon and/or carbon monoxide in the first portion of the exhaust gas. In this way, the first aftertreatment component substrate 122 may oxidize a hydrocarbon and/or carbon monoxide from the first portion of the exhaust gas prior to the exhaust gas being provided from the first casing 120. For example, the first aftertreatment component substrate 122 may be an oxidation catalyst member that is configured to facilitate conversion of carbon monoxide in the first portion of the exhaust gas into carbon dioxide. In this example, the first casing 120 may receive the carbon monoxide and provide the carbon dioxide.

The oxidation catalyst member included in the first aftertreatment component substrate 122 may be directional, meaning that it is desired for the exhaust gas to flow through the first aftertreatment component substrate 122 in a single direction, or non-directional, meaning that it is desired for the exhaust gas to flow through the first aftertreatment component substrate 122 in any direction. In applications where the oxidation catalyst member included in the first aftertreatment component substrate 122 is directional, the first casing 120 may include structures or features that facilitate (e.g., in a poka-yoke manner, etc.) fastening of the first casing 120 to first housing panel 106 in only one orientation of the first casing 120 relative to the first housing panel 106.

The exhaust gas aftertreatment system 100 also includes a first treatment fluid delivery system 124. As is explained in more detail herein, the first treatment fluid delivery system 124 is configured to facilitate the introduction of a first treatment fluid into the exhaust gas. The first treatment fluid delivery system 124 includes a first dosing module 126 (e.g., doser, reductant doser, hydrocarbon doser, etc.). The first dosing module 126 is configured to facilitate passage of the first treatment fluid through the introduction housing 116 and into the introduction housing 116. The first dosing module 126 may include an insulator interposed between a portion of the first dosing module 126 and the portion of the introduction housing 116 on which the first dosing module 126 is mounted. In various embodiments, the first dosing module 126 is coupled to the introduction housing 116.

The first treatment fluid delivery system 124 also includes a first treatment fluid source 128 (e.g., reductant tank, hydrocarbon tank, etc.). The first treatment fluid source 128 is configured to contain the first treatment fluid. The first treatment fluid source 128 is fluidly coupled to the first dosing module 126 and configured to provide the first treatment fluid to the first dosing module 126. The first treatment fluid source 128 may include multiple first treatment fluid sources 128 (e.g., multiple tanks connected in series or in parallel, etc.). The first treatment fluid source 128 may be, for example, a diesel exhaust fluid tank containing Adblue® or a fuel tank containing fuel.

The first treatment fluid delivery system 124 also includes a first treatment fluid pump 130 (e.g., supply unit, etc.). The first treatment fluid pump 130 is fluidly coupled to the first treatment fluid source 128 and the first dosing module 126 and configured to receive the first treatment fluid from the first treatment fluid source 128 and to provide the first treatment fluid to the first dosing module 126. The first treatment fluid pump 130 is used to pressurize the first treatment fluid from the first treatment fluid source 128 for delivery to the first dosing module 126. In some embodiments, the first treatment fluid pump 130 is pressure controlled. In some embodiments, the first treatment fluid pump 130 is coupled to the frame of the vehicle having the exhaust gas aftertreatment system 100.

In some embodiments, the first treatment fluid delivery system 124 also includes a first treatment fluid filter 132. The first treatment fluid filter 132 is fluidly coupled to the first treatment fluid source 128 and the first treatment fluid pump 130 and is configured to receive the first treatment fluid from the first treatment fluid source 128 and to provide the first treatment fluid to the first treatment fluid pump 130. The first treatment fluid filter 132 filters the first treatment fluid prior to the first treatment fluid being provided to internal components of the first treatment fluid pump 130. For example, the first treatment fluid filter 132 may inhibit or prevent the transmission of solids to the internal components of the first treatment fluid pump 130. In this way, the first treatment fluid filter 132 may facilitate prolonged desirable operation of the first treatment fluid pump 130.

The first dosing module 126 includes at least one first injector 134 (e.g., insertion device, etc.). The first injector 134 is fluidly coupled to the first treatment fluid pump 130 and configured to receive the first treatment fluid from the first treatment fluid pump 130. The first injector 134 is configured to dose (e.g., inject, insert, etc.) the first treatment fluid received by the first dosing module 126 into the exhaust gas within the introduction housing 116.

In some embodiments, the first treatment fluid delivery system 124 also includes a first air pump 136 and a first air source 138 (e.g., air intake, etc.). The first air pump 136 is fluidly coupled to the first air source 138 and is configured to receive air from the first air source 138. The first air pump 136 is fluidly coupled to the first dosing module 126 and is configured to provide the air to the first dosing module 126. In some applications, the first dosing module 126 is configured to mix the air and the first treatment fluid into an air-treatment fluid mixture and to provide the air-treatment fluid mixture to the first injector 134 (e.g., for dosing into the exhaust gas within the introduction housing 116, etc.). The first injector 134 is fluidly coupled to the first air pump 136 and configured to receive the air from the first air pump 136. The first injector 134 is configured to dose the air-treatment fluid mixture into the exhaust gas within the introduction housing 116. In some of these embodiments, the first treatment fluid delivery system 124 also includes a first air filter 140. The first air filter 140 is fluidly coupled to the first air source 138 and the first air pump 136 and is configured to receive the air from the first air source 138 and to provide the air to the first air pump 136. The first air filter 140 is configured to filter the air prior to the air being provided to the first air pump 136. In other embodiments, the first treatment fluid delivery system 124 does not include the first air pump 136 and/or the first treatment fluid delivery system 124 does not include the first air source 138. In such embodiments, the first dosing module 126 is not configured to mix the first treatment fluid with the air.

In various embodiments, the first dosing module 126 is configured to receive air and treatment fluid, and doses the air-treatment fluid mixture into the introduction housing 116. In various embodiments, the first dosing module 126 is configured to receive treatment fluid (and does not receive air), and doses the first treatment fluid into the introduction housing 116. In various embodiments, the first dosing module 126 is configured to receive treatment fluid, and doses the first treatment fluid into the introduction housing 116. In various embodiments, the first dosing module 126 is configured to receive air and treatment fluid, and doses the air-treatment fluid mixture into the introduction housing 116.

The exhaust gas aftertreatment system 100 also includes a first decomposition chamber 142 (e.g., decomposition reactor, reactor pipe, decomposition tube, reactor tube, etc.). The first decomposition chamber 142 includes a first decomposition chamber casing 144 (e.g., housing, shell, body, etc.).

The housing assembly 104 also includes a third housing panel 146 (e.g., platform, plate, flange, etc.). As is explained in more detail herein, the third housing panel 146 is configured to support various components of the exhaust gas aftertreatment system 100 (e.g., on a frame of a vehicle having the exhaust gas aftertreatment system 100, etc.). The third housing panel 146 includes a third housing panel inlet aperture 148 (e.g., hole, window, opening, etc.).

The first decomposition chamber casing 144 extends through the third housing panel inlet aperture 148. In this way, the third housing panel 146 supports the first decomposition chamber casing 144 (e.g., relative to a frame that the third housing panel 146 is coupled to, etc.). In various embodiments, the first decomposition chamber casing 144 is coupled to the third housing panel 146 (e.g., at least partially around the third housing panel inlet aperture 148, etc.).

The first decomposition chamber 142 includes a mixer 150 (e.g., a swirl generating device, a vane plate, inlet plate, deflector plate, etc.). The mixer 150 is located within the first decomposition chamber casing 144. The mixer 150 is configured to receive a mixture of the exhaust gas from the first aftertreatment component 118 and the first treatment fluid or the air-treatment fluid mixture received from the first injector 134, and to facilitate mixing of the exhaust gas and the first treatment fluid or the air-treatment fluid mixture. The mixer 150 is configured to facilitate swirling (e.g., tumbling, rotation, etc.) of the exhaust gas and mixing (e.g., combination, etc.) of the exhaust gas and the first treatment fluid or the air-treatment fluid mixture so as to disperse the first treatment fluid within the exhaust gas downstream of the mixer 150. By dispersing the first treatment fluid within the exhaust gas (e.g., to obtain an increased uniformity index, etc.) using the mixer 150, reduction of emission of undesirable components in the exhaust gas is enhanced or a temperature of the exhaust gas may be increased.

In various embodiments, the mixer 150 includes an upstream mixing plate (e.g., vane plate, baffle plate, etc.). The upstream mixing plate may include a plurality of upstream mixing plate vanes (e.g., baffles, guides, etc.) that extend from an upstream mixing plate hub (e.g., base, etc.) of the upstream mixing plate. Adjacent pairs of the upstream mixing plate vanes define upstream mixing plate apertures (e.g., holes, openings, etc.). The exhaust gas flows through the upstream mixing plate via the upstream mixing plate apertures. The upstream mixing plate vanes are angled relative to the upstream mixing plate hub which causes the exhaust gas to swirl as the exhaust gas flows through the upstream mixing plate. This swirl enhances mixing of the first treatment fluid or the air-treatment fluid mixture downstream of the upstream mixing plate. In some of these embodiments, the mixer 150 also includes a downstream mixing plate (e.g., vane plate, baffle plate, etc.). The downstream mixing plate may include a plurality of downstream mixing plate vanes (e.g., baffles, guides, etc.) that extend from a downstream mixing plate hub (e.g., base, etc.) of the downstream mixing plate. Adjacent pairs of the downstream mixing plate vanes define downstream mixing plate apertures (e.g., holes, openings, etc.). The exhaust gas flows through the downstream mixing plate via the downstream mixing plate apertures (e.g., after first flowing through the upstream mixing plate, etc.). The downstream mixing plate vanes are angled relative to the downstream mixing plate hub which causes the exhaust gas to swirl as the exhaust gas flows through the downstream mixing plate. This swirl enhances mixing of the first treatment fluid or the air-treatment fluid mixture downstream of the downstream mixing plate. The mixer 150 may also include one or more perforated plates. Each of the perforated plates includes a plurality of perforations through which the exhaust gas may flow.

The housing assembly 104 also includes a first exhaust gas transfer conduit 152 (e.g., line, pipe, etc.). The first exhaust gas transfer conduit 152 is coupled to the first decomposition chamber casing 144 (e.g., downstream of the mixer 150, etc.). The first exhaust gas transfer conduit 152 is fluidly coupled to the first decomposition chamber casing 144 and is configured to receive the mixture of the exhaust gas and the first treatment fluid from the first decomposition chamber casing 144.

The exhaust gas aftertreatment system 100 also includes a second aftertreatment component 154 (e.g., exhaust gas aftertreatment component, aftertreatment module, etc.). The second aftertreatment component 154 includes a second casing 156 (e.g., housing, shell, body, etc.).

The third housing panel 146 also includes a third housing panel first transfer aperture 158 (e.g., hole, window, opening, etc.). The second casing 156 extends through the third housing panel first transfer aperture 158. In this way, the third housing panel 146 supports the second casing 156 (e.g., relative to a frame that the third housing panel 146 is coupled to, etc.). In various embodiments, the second casing 156 is coupled to the third housing panel 146 (e.g., at least partially around the third housing panel first transfer aperture 158, etc.).

The second aftertreatment component 154 also includes a second aftertreatment component substrate 160 (e.g., working member, etc.). The second aftertreatment component substrate 160 is positioned within the second casing 156. For example, the second aftertreatment component substrate 160 may be coupled to the second casing 156.

The second aftertreatment component substrate 160 receives the exhaust gas from the first decomposition chamber casing 144 (e.g., via the first exhaust gas transfer conduit 152, etc.). The second aftertreatment component substrate 160 is configured to facilitate treatment of the exhaust gas. This treatment may facilitate reduction of emission of undesirable components in the exhaust gas. This treatment may also or instead facilitate conversion of various oxidation components of the exhaust gas into other components. This treatment may also or instead facilitate removal of particulates from the exhaust gas.

In various embodiments, the second aftertreatment component substrate 160 includes a conversion catalyst member (e.g., selective catalytic reduction (SCR) catalyst member, vanadium SCR (VSCR) catalyst member, conversion catalyst member, catalyst metals, etc.). In these embodiments, the first treatment fluid provided by the first dosing module 126 may be reductant and the second aftertreatment component substrate 160 may be configured to cause decomposition of components of the exhaust gas using the reductant (e.g., via catalytic reactions, etc.). Specifically, the reductant that has been provided into the exhaust gas by the first injector 134 undergoes the processes of evaporation, thermolysis, and hydrolysis to form non-$NO_x$ emissions within the second casing 156. In this way, the second aftertreatment component substrate 160 is configured to assist in the reduction of $NO_x$ emissions by accelerating a $NO_x$ reduction process between the reductant and the $NO_x$ of the exhaust gas into diatomic nitrogen, water, and/or carbon dioxide. The conversion catalyst member included in the second aftertreatment component substrate 160 may include, for example, vanadium, platinum, rhodium, palladium, zinc, copper, or other similar materials. In some embodiments, the conversion catalyst member included in the second aftertreatment component substrate 160 is a ceramic conversion catalyst member.

The conversion catalyst member included in the second aftertreatment component substrate 160 may be directional, meaning that it is desired for the exhaust gas to flow through the second aftertreatment component substrate 160 in a single direction, or non-directional, meaning that it is desired for the exhaust gas to flow through the second aftertreatment component substrate 160 in any direction. In applications where the conversion catalyst member included in the second aftertreatment component substrate 160 is directional, the second casing 156 may include structures or features that facilitate (e.g., in a poka-yoke manner, etc.) fastening of the second casing 156 to the third housing panel 146 in only one orientation of the second casing 156 relative to the third housing panel 146.

The exhaust gas aftertreatment system 100 also includes a third aftertreatment component 162 (e.g., exhaust gas aftertreatment component, aftertreatment module, etc.). The third aftertreatment component 162 includes a third casing 164 (e.g., housing, shell, body, etc.).

The second housing panel 112 also includes a second housing panel first transfer aperture 166 (e.g., hole, window, opening, etc.). The third casing 164 extends through the second housing panel first transfer aperture 166. In this way, the second housing panel 112 supports the third casing 164 (e.g., relative to a frame that the second housing panel 112 is coupled to, etc.). In various embodiments, the third casing 164 is coupled to the second housing panel 112 (e.g., at least partially around the second housing panel first transfer aperture 166, etc.).

The third aftertreatment component 162 also includes a third aftertreatment component substrate 168 (e.g., working member, etc.). The third aftertreatment component substrate 168 is positioned within the third casing 164. For example, the third aftertreatment component substrate 168 may be coupled to the third casing 164.

The third aftertreatment component substrate 168 receives the exhaust gas from the second casing 156 (e.g., via the third casing 164, etc.). The third aftertreatment component substrate 168 is configured to facilitate treatment of the exhaust gas. This treatment may facilitate reduction of emission of undesirable components in the exhaust gas. This treatment may also or instead facilitate conversion of various oxidation components of the exhaust gas into other components. This treatment may also or instead facilitate removal of particulates from the exhaust gas.

In various embodiments, the third aftertreatment component substrate 168 includes an exhaust gas filtration member (e.g., a diesel particulate filter (DPF), etc.). In these embodiments, the third aftertreatment component substrate 168 is configured to remove particulates from the exhaust gas prior to the exhaust gas being provided from the third casing 164. For example, the exhaust gas received by the third casing 164 may have a first concentration of the particulates, the third aftertreatment component substrate 168 may remove at least some of the particulates from the exhaust gas, and the third casing 164 may provide the exhaust gas with a second concentration of the particulates that is less than the first concentration.

The exhaust gas filtration member included in the third aftertreatment component substrate 168 may be directional, meaning that it is desired for the exhaust gas to flow through the third aftertreatment component substrate 168 in a single direction, or non-directional, meaning that it is desired for the exhaust gas to flow through the third aftertreatment component substrate 168 in any direction. In applications where the exhaust gas filtration member included in the third aftertreatment component substrate 168 is directional, the third casing 164 may include structures or features that facilitate (e.g., in a poka-yoke manner, etc.) fastening of the third casing 164 to the second housing panel 112 in only one orientation of the third casing 164 relative to the second housing panel 112.

The third casing 164 can be selectively attached to the housing assembly 104 and selectively detached from the second housing panel 112. This enables the DPF to be removed from the housing assembly 104 for servicing and/or replacement. For example, a user may detach the third casing 164 from the housing assembly 104, remove the third aftertreatment component 162 from the housing assembly 104, insert a new third aftertreatment component 162 into the housing assembly 104, and attach the third casing 164 to the second housing panel 112. In this way, a capability of the exhaust gas aftertreatment system 100 to treat the exhaust gas may be maintained or modified.

In various embodiments, the first housing panel 106 also includes a first housing panel first transfer aperture 170 (e.g., hole, window, opening, etc.). The third casing 164 extends through the first housing panel first transfer aperture 170. In this way, the first housing panel 106 supports the third casing 164 (e.g., relative to a frame that the first housing panel 106 is coupled to, etc.). In various embodiments, the third casing 164 is coupled to the first housing panel 106 (e.g., at least partially around the first housing panel first transfer aperture 170, etc.).

The housing assembly 104 also includes a second exhaust gas transfer conduit 172 (e.g., line, pipe, etc.). The second exhaust gas transfer conduit 172 is coupled to the third casing 164 (e.g., downstream of the third aftertreatment component 162, etc.). The second exhaust gas transfer conduit 172 is fluidly coupled to the third casing 164 and is configured to receive the exhaust gas from the third casing 164 (e.g., after particulates have been removed from the exhaust gas, etc.).

The exhaust gas aftertreatment system 100 also includes a second decomposition chamber 174 (e.g., decomposition reactor, reactor pipe, decomposition tube, reactor tube, etc.). The second decomposition chamber 174 includes a second decomposition chamber casing 176 (e.g., housing, shell, body, etc.).

The second housing panel 112 also includes a second housing panel second transfer aperture 178 (e.g., hole, window, opening, etc.). The second decomposition chamber casing 176 extends through the second housing panel second transfer aperture 178. In this way, the second housing panel 112 supports the second decomposition chamber casing 176 (e.g., relative to a frame that the second housing panel 112 is coupled to, etc.). In various embodiments, the second decomposition chamber casing 176 is coupled to the second housing panel 112 (e.g., at least partially around the second housing panel second transfer aperture 178, etc.).

In various embodiments, the first housing panel 106 also includes a first housing panel second transfer aperture 180 (e.g., hole, window, opening, etc.). The second decomposition chamber casing 176 extends through the first housing panel second transfer aperture 180. In this way, the first housing panel 106 supports the second decomposition chamber casing 176 (e.g., relative to a frame that the first housing panel 106 is coupled to, etc.). In various embodiments, the second decomposition chamber casing 176 is coupled to the first housing panel 106 (e.g., at least partially around the first housing panel second transfer aperture 180, etc.).

The exhaust gas aftertreatment system 100 also includes a second treatment fluid delivery system 182. As is explained in more detail herein, the second treatment fluid delivery system 182 is configured to facilitate the introduction of a second treatment fluid into the exhaust gas. The second treatment fluid delivery system 182 includes a second dosing module 184 (e.g., doser, reductant doser, hydrocarbon doser, etc.). The second dosing module 184 is configured to facilitate passage of the second treatment fluid through the second decomposition chamber casing 176 and into the second decomposition chamber casing 176. The second dosing module 184 may include an insulator interposed between a portion of the second dosing module 184 and the portion of the second decomposition chamber casing 176 on which the second dosing module 184 is mounted. In various embodiments, the second dosing module 184 is coupled to the second decomposition chamber casing 176.

The second treatment fluid delivery system 182 also includes a second treatment fluid source 186 (e.g., reductant tank, hydrocarbon tank, etc.). The second treatment fluid source 186 is configured to contain the second treatment fluid. The second treatment fluid source 186 is fluidly coupled to the second dosing module 184 and configured to provide the second treatment fluid to the second dosing module 184. The second treatment fluid source 186 may include multiple second treatment fluid sources 186 (e.g., multiple tanks connected in series or in parallel, etc.). The second treatment fluid source 186 may be, for example, a diesel exhaust fluid tank containing Adblue® or a fuel tank containing fuel.

The second treatment fluid delivery system 182 also includes a second treatment fluid pump 188 (e.g., supply unit, etc.). The second treatment fluid pump 188 is fluidly coupled to the second treatment fluid source 186 and the second dosing module 184 and configured to receive the second treatment fluid from the second treatment fluid source 186 and to provide the second treatment fluid to the second dosing module 184. The second treatment fluid pump 188 is used to pressurize the second treatment fluid from the second treatment fluid source 186 for delivery to the second dosing module 184. In some embodiments, the second treatment fluid pump 188 is pressure controlled. In some embodiments, the second treatment fluid pump 188 is coupled to the frame of the vehicle having the exhaust gas aftertreatment system 100.

In some embodiments, the second treatment fluid delivery system 182 also includes a second treatment fluid filter 190. The second treatment fluid filter 190 is fluidly coupled to the second treatment fluid source 186 and the second treatment fluid pump 188 and is configured to receive the second treatment fluid from the second treatment fluid source 186 and to provide the second treatment fluid to the second treatment fluid pump 188. The second treatment fluid filter 190 filters the second treatment fluid prior to the second treatment fluid being provided to internal components of the second treatment fluid pump 188. For example, the second treatment fluid filter 190 may inhibit or prevent the transmission of solids to the internal components of the second treatment fluid pump 188. In this way, the second treatment fluid filter 190 may facilitate prolonged desirable operation of the second treatment fluid pump 188.

The second dosing module 184 includes at least one second injector 192 (e.g., insertion device, etc.). The second injector 192 is fluidly coupled to the second treatment fluid pump 188 and configured to receive the second treatment fluid from the second treatment fluid pump 188. The second injector 192 is configured to dose (e.g., inject, insert, etc.) the second treatment fluid received by the second dosing module 184 into the exhaust gas within the second decomposition chamber casing 176.

In some embodiments, the second treatment fluid delivery system 182 also includes a second air pump 194 and a second air source 196 (e.g., air intake, etc.). The second air pump 194 is fluidly coupled to the second air source 196 and is configured to receive air from the second air source 196. The second air pump 194 is fluidly coupled to the second dosing module 184 and is configured to provide the air to the second dosing module 184. In some applications, the second dosing module 184 is configured to mix the air and the second treatment fluid into an air-treatment fluid mixture and to provide the air-treatment fluid mixture to the second injector 192 (e.g., for dosing into the exhaust gas within the second decomposition chamber casing 176, etc.). The second injector 192 is fluidly coupled to the second air pump 194 and configured to receive the air from the second air pump 194. The second injector 192 is configured to dose the air-treatment fluid mixture into the exhaust gas within the second decomposition chamber casing 176. In some of these embodiments, the second treatment fluid delivery system 182 also includes a second air filter 198. The second air filter 198 is fluidly coupled to the second air source 196 and the second air pump 194 and is configured to receive the air from the second air source 196 and to provide the air to the second air pump 194. The second air filter 198 is configured to filter the air prior to the air being provided to the second air pump 194. In other embodiments, the second treatment fluid delivery system 182 does not include the second air pump 194 and/or the second treatment fluid delivery system 182 does not include the second air source 196. In such embodiments, the second dosing module 184 is not configured to mix the second treatment fluid with the air.

In various embodiments, the second dosing module 184 is configured to receive air and treatment fluid, and doses the air-treatment fluid mixture into the second decomposition chamber casing 176. In various embodiments, the second dosing module 184 is configured to receive treatment fluid (and does not receive air), and doses the second treatment fluid into the second decomposition chamber casing 176. In various embodiments, the second dosing module 184 is configured to receive treatment fluid, and doses the second treatment fluid into the second decomposition chamber casing 176. In various embodiments, the second dosing module 184 is configured to receive air and treatment fluid, and doses the air-treatment fluid mixture into the second decomposition chamber casing 176.

In various embodiments, the exhaust gas and the second treatment fluid or the air-treatment fluid is configured to be mixed within the second decomposition chamber 174. For instance, the second decomposition chamber 174 may include a mixer (e.g., a swirl generating device, a vane plate, inlet plate, deflector plate, etc.). The mixer may be similar to that described above with respect to the mixer 150. The mixer is located within the second decomposition chamber casing 176. The mixer is configured to receive the exhaust gas from the third aftertreatment component 162. The mixer is also configured to mix the second treatment fluid or the air-treatment fluid mixture received from the second injector 192. The mixer is configured to facilitate swirling (e.g., tumbling, rotation, etc.) of the exhaust gas and mixing (e.g., combination, etc.) of the exhaust gas and the second treatment fluid or the air-treatment fluid mixture so as to disperse the second treatment fluid within the exhaust gas downstream of the mixer. By dispersing the second treatment fluid within the exhaust gas (e.g., to obtain an increased uniformity index, etc.) using the mixer, reduction of emission of undesirable components in the exhaust gas is enhanced or a temperature of the exhaust gas may be increased.

In various embodiments, the second treatment fluid delivery system 182 utilizes the first treatment fluid pump 130. In these embodiments, the first treatment fluid pump 130 is fluidly coupled to the first treatment fluid source 128 and the second dosing module 184 and configured to receive the first treatment fluid from the first treatment fluid source 128 and to provide the first treatment fluid to the first dosing module 126 and the second dosing module 184. Similarly, the second treatment fluid delivery system 182 may additionally or alternatively utilize the first air pump 136. For example, the first air pump 136 may be fluidly coupled to the first air source 138 and configured to receive air from the first air source 138 and to provide the air to the first dosing module 126 and the second dosing module 184.

In various embodiments, the second treatment fluid pump 188 is fluidly coupled to the first treatment fluid source 128 and the second dosing module 184 and configured to receive the first treatment fluid from the first treatment fluid source 128 and to provide the first treatment fluid to the second dosing module 184. The second treatment fluid pump 188 is used to pressurize the first treatment fluid from the first treatment fluid source 128 for delivery to the second dosing module 184. In various embodiments, the first treatment fluid source 128 is the same as the second treatment fluid source 186.

In some embodiments, the second air pump 194 is fluidly coupled to the first air source 138 and is configured to receive air from the first air source 138. The second air pump 194 is fluidly coupled to the second dosing module 184 and is configured to provide the air to the second dosing module 184. In some embodiments, the first air source 138 is the same as the second air source 196.

In some embodiments, the first treatment fluid (e.g., provided by the first treatment fluid source 128, etc.) is different from the second treatment fluid (e.g., provided by the second treatment fluid source 186, etc.). For example, the first treatment fluid may be a high-temperature treatment fluid (e.g., a reductant optimized for use with high temperature exhaust gas, etc.) and the second treatment fluid may be a mid-temperature treatment fluid (e.g., a reductant optimized for use with mid-temperature exhaust gas, etc.).

The housing assembly 104 also includes a fourth housing panel 200 (e.g., platform, plate, flange, etc.). As is explained in more detail herein, the fourth housing panel 200 is configured to support various components of the exhaust gas aftertreatment system 100 (e.g., on a frame of a vehicle having the exhaust gas aftertreatment system 100, etc.). The fourth housing panel 200 includes a fourth housing panel transfer aperture 202 (e.g., hole, window, opening, etc.).

The second decomposition chamber casing 176 extends through the fourth housing panel transfer aperture 202. In this way, the fourth housing panel 200 supports the second decomposition chamber casing 176 (e.g., relative to a frame that the fourth housing panel 200 is coupled to, etc.). In various embodiments, the second decomposition chamber casing 176 is coupled to the fourth housing panel 200 (e.g., at least partially around the fourth housing panel transfer aperture 202, etc.).

The housing assembly 104 also includes a fifth housing panel 204 (e.g., platform, plate, flange, etc.). As is explained in more detail herein, the fifth housing panel 204 is configured to support various components of the exhaust gas aftertreatment system 100 (e.g., on a frame of a vehicle having the exhaust gas aftertreatment system 100, etc.). The fifth housing panel 204 includes a fifth housing panel transfer aperture 206 (e.g., hole, window, opening, etc.).

The second decomposition chamber casing 176 extends through the fifth housing panel transfer aperture 206. In this way, the fifth housing panel 204 supports the second decomposition chamber casing 176 (e.g., relative to a frame that the fifth housing panel 204 is coupled to, etc.). In various embodiments, the second decomposition chamber casing 176 is coupled to the fifth housing panel 204 (e.g., at least partially around the fifth housing panel transfer aperture 206, etc.).

At an outlet of the second decomposition chamber 174, the exhaust gas is divided into a first portion and a second portion. As is explained in more detail herein, the first portion and the second portion are simultaneously treated by the exhaust gas aftertreatment system 100. In this way, an efficiency of the exhaust gas aftertreatment system 100 may be increased, thereby making the exhaust gas aftertreatment system 100 more desirable than other aftertreatment systems which do not divide exhaust gas into multiple portions for simultaneous treatment.

The housing assembly 104 also includes a first exhaust gas dividing conduit 208 (e.g., line, pipe, etc.). The first exhaust gas dividing conduit 208 is coupled to the second decomposition chamber casing 176 (e.g., downstream of the second decomposition chamber 174, etc.). The first exhaust gas dividing conduit 208 is fluidly coupled to the second decomposition chamber casing 176 and is configured to receive the first portion of the mixture of the exhaust gas and the second treatment fluid from the second decomposition chamber casing 176.

The exhaust gas aftertreatment system 100 also includes a fourth aftertreatment component 210 (e.g., exhaust gas aftertreatment component, aftertreatment module, etc.). The fourth aftertreatment component 210 includes a fourth casing 212 (e.g., housing, shell, body, etc.).

The fifth housing panel 204 also includes a fifth housing panel first conveyer aperture 214 (e.g., hole, window, opening, etc.). The fourth casing 212 extends through the fifth housing panel first conveyer aperture 214. In this way, the fifth housing panel 204 supports the fourth casing 212 (e.g., relative to a frame that the fifth housing panel 204 is coupled to, etc.). In various embodiments, the fourth casing 212 is coupled to the fifth housing panel 204 (e.g., at least partially around the fifth housing panel first conveyer aperture 214, etc.).

The fourth housing panel 200 also includes a fourth housing panel first conveyer aperture 216 (e.g., hole, window, opening, etc.). The fourth casing 212 extends through the fourth housing panel first conveyer aperture 216. In this way, the fourth housing panel 200 supports the fourth casing 212 (e.g., relative to a frame that the fourth housing panel 200 is coupled to, etc.). In various embodiments, the fourth casing 212 is coupled to the fourth housing panel 200 (e.g., at least partially around the fourth housing panel first conveyer aperture 216, etc.).

The fourth aftertreatment component 210 also includes a fourth aftertreatment component substrate 218 (e.g., working member, etc.). The fourth aftertreatment component substrate 218 is positioned within the fourth casing 212. For example, the fourth aftertreatment component substrate 218 may be coupled to the fourth casing 212.

The fourth aftertreatment component substrate 218 receives the exhaust gas from the second decomposition chamber casing 176 (e.g., via the first exhaust gas dividing conduit 208, etc.). The fourth aftertreatment component substrate 218 is configured to facilitate treatment of the exhaust gas. This treatment may facilitate reduction of emission of undesirable components in the exhaust gas. This treatment may also or instead facilitate conversion of various oxidation components of the exhaust gas into other components. This treatment may also or instead facilitate removal of particulates from the exhaust gas.

In various embodiments, the fourth aftertreatment component substrate 218 includes a conversion catalyst member (e.g., SCR catalyst member, conversion catalyst member, catalyst metals, etc.). In these embodiments, the second treatment fluid provided by the second dosing module 184 may be reductant and the fourth aftertreatment component substrate 218 may be configured to cause decomposition of components of the first portion of the exhaust gas using the reductant (e.g., via catalytic reactions, etc.). Specifically, the reductant that has been provided into the exhaust gas by the second injector 192 undergoes the processes of evaporation, thermolysis, and hydrolysis to form non-$NO_x$ emissions within the fourth casing 212. In this way, the fourth aftertreatment component substrate 218 is configured to assist in the reduction of $NO_x$ emissions by accelerating a $NO_x$ reduction process between the reductant and the $NO_x$ of the exhaust gas into diatomic nitrogen, water, and/or carbon dioxide. The conversion catalyst member included in the fourth aftertreatment component substrate 218 may include, for example, vanadium, platinum, rhodium, palladium, zinc, copper, or other similar materials. In some embodiments, the conversion catalyst member included in the fourth aftertreatment component substrate 218 is a ceramic conversion catalyst member.

The conversion catalyst member included in the fourth aftertreatment component substrate 218 may be directional, meaning that it is desired for the exhaust gas to flow through the fourth aftertreatment component substrate 218 in a single direction, or non-directional, meaning that it is desired for the exhaust gas to flow through the fourth aftertreatment component substrate 218 in any direction. In applications where the conversion catalyst member included in the fourth aftertreatment component substrate 218 is directional, the fourth casing 212 may include structures or features that facilitate (e.g., in a poka-yoke manner, etc.) fastening of the fourth casing 212 to the fourth housing panel 200 and/or the fifth housing panel 204 in only one orientation of the fourth casing 212 relative to the fourth housing panel 200 and/or the fifth housing panel 204.

In various embodiments, the third housing panel 146 also includes a third housing panel first conveyer aperture 220 (e.g., hole, window, opening, etc.). The fourth casing 212 extends through the third housing panel first conveyer aperture 220. In this way, the third housing panel 146 supports the fourth casing 212 (e.g., relative to a frame that the third housing panel 146 is coupled to, etc.). In various embodiments, the fourth casing 212 is coupled to the third housing panel 146 (e.g., at least partially around the third housing panel first conveyer aperture 220, etc.).

The housing assembly 104 also includes a first exhaust gas provider conduit 222 (e.g., line, pipe, etc.). The first exhaust gas provider conduit 222 is coupled to the fourth casing 212 (e.g., downstream of the fourth aftertreatment component 210, etc.). The first exhaust gas provider conduit 222 is fluidly coupled to the fourth casing 212 and is configured to receive the exhaust gas from the fourth casing 212 (e.g., after the exhaust gas has been treated by the fourth aftertreatment component 210, etc.).

The exhaust gas conduit system 102 includes an outlet exhaust gas conduit 224 (e.g., line, pipe, etc.). The outlet exhaust gas conduit 224 is coupled to the first exhaust gas provider conduit 222 and is configured to receive the exhaust gas from the first exhaust gas provider conduit 222.

The third housing panel 146 also includes a third housing panel outlet aperture 226 (e.g., hole, window, opening, etc.). The outlet exhaust gas conduit 224 extends through the third housing panel outlet aperture 226. In this way, the third housing panel 146 supports the outlet exhaust gas conduit 224 (e.g., relative to a frame that the third housing panel 146 is coupled to, etc.). In various embodiments, the outlet exhaust gas conduit 224 is coupled to the third housing panel 146 (e.g., at least partially around the third housing panel outlet aperture 226, etc.).

The second housing panel 112 also includes a second housing panel outlet aperture 228 (e.g., hole, window, opening, etc.). The outlet exhaust gas conduit 224 extends through the second housing panel outlet aperture 228. In this way, the second housing panel 112 supports the outlet exhaust gas conduit 224 (e.g., relative to a frame that the second housing panel 112 is coupled to, etc.). In various embodiments, the outlet exhaust gas conduit 224 is coupled to the second housing panel 112 (e.g., at least partially around the second housing panel outlet aperture 228, etc.).

The first housing panel 106 also includes a first housing panel outlet aperture 230 (e.g., hole, window, opening, etc.). The outlet exhaust gas conduit 224 extends through the first housing panel outlet aperture 230. In this way, the first housing panel 106 supports the outlet exhaust gas conduit 224 (e.g., relative to a frame that the first housing panel 106 is coupled to, etc.). In various embodiments, the outlet exhaust gas conduit 224 is coupled to the first housing panel 106 (e.g., at least partially around the first housing panel outlet aperture 230, etc.).

The housing assembly 104 also includes a second exhaust gas dividing conduit 232 (e.g., line, pipe, etc.). The second exhaust gas dividing conduit 232 is coupled to the second decomposition chamber casing 176 (e.g., downstream of the second decomposition chamber 174, etc.). The second exhaust gas dividing conduit 232 is fluidly coupled to the second decomposition chamber casing 176 and is configured to receive the second portion of the mixture of the exhaust gas and the second treatment fluid from the second decomposition chamber casing 176.

The exhaust gas aftertreatment system 100 also includes a fifth aftertreatment component 234 (e.g., exhaust gas aftertreatment component, aftertreatment module, etc.). The fifth aftertreatment component 234 includes a fifth casing 236 (e.g., housing, shell, body, etc.).

The fifth housing panel 204 also includes a fifth housing panel second conveyer aperture 238 (e.g., hole, window, opening, etc.). The fifth casing 236 extends through the fifth housing panel second conveyer aperture 238. In this way, the fifth housing panel 204 supports the fifth casing 236 (e.g., relative to a frame that the fifth housing panel 204 is coupled to, etc.). In various embodiments, the fifth casing 236 is coupled to the fifth housing panel 204 (e.g., at least partially around the fifth housing panel second conveyer aperture 238, etc.).

The fourth housing panel 200 also includes a fourth housing panel second conveyer aperture 240 (e.g., hole, window, opening, etc.). The fifth casing 236 extends through the fourth housing panel second conveyer aperture 240. In this way, the fourth housing panel 200 supports the fifth casing 236 (e.g., relative to a frame that the fourth housing panel 200 is coupled to, etc.). In various embodiments, the fifth casing 236 is coupled to the fourth housing panel 200 (e.g., at least partially around the fourth housing panel second conveyer aperture 240, etc.).

The fifth aftertreatment component 234 also includes a fifth aftertreatment component substrate 242 (e.g., working member, etc.). The fifth aftertreatment component substrate 242 is positioned within the fifth casing 236. For example, the fifth aftertreatment component substrate 242 may be coupled to the fifth casing 236.

The fifth aftertreatment component substrate 242 receives the exhaust gas from the second decomposition chamber casing 176 (e.g., via the second exhaust gas dividing conduit 232, etc.). The fifth aftertreatment component substrate 242 is configured to facilitate treatment of the exhaust gas. This treatment may facilitate reduction of emission of undesirable components in the exhaust gas. This treatment may also or instead facilitate conversion of various oxidation components of the exhaust gas into other components. This treatment may also or instead facilitate removal of particulates from the exhaust gas.

In various embodiments, the fifth aftertreatment component substrate 242 includes a conversion catalyst member (e.g., SCR catalyst member, conversion catalyst member, catalyst metals, etc.). In these embodiments, the second treatment fluid provided by the second dosing module 184 may be reductant and the fifth aftertreatment component substrate 242 may be configured to cause decomposition of components of the second portion of the exhaust gas using the reductant (e.g., via catalytic reactions, etc.). Specifically, the reductant that has been provided into the exhaust gas by the second injector 192 undergoes the processes of evaporation, thermolysis, and hydrolysis to form non-$NO_x$ emissions within the fifth casing 236. In this way, the fifth aftertreatment component substrate 242 is configured to assist in the reduction of $NO_x$ emissions by accelerating a $NO_x$ reduction process between the reductant and the $NO_x$ of the exhaust gas into diatomic nitrogen, water, and/or carbon dioxide. The conversion catalyst member included in the fifth aftertreatment component substrate 242 may include, for example, vanadium, platinum, rhodium, palladium, zinc, copper, or other similar materials. In some embodiments, the conversion catalyst member included in the fifth aftertreatment component substrate 242 is a ceramic conversion catalyst member.

The conversion catalyst member included in the fifth aftertreatment component substrate 242 may be directional, meaning that it is desired for the exhaust gas to flow through the fifth aftertreatment component substrate 242 in a single direction, or non-directional, meaning that it is desired for the exhaust gas to flow through the fifth aftertreatment component substrate 242 in any direction. In applications where the conversion catalyst member included in the fifth aftertreatment component substrate 242 is directional, the fifth casing 236 may include structures or features that facilitate (e.g., in a poka-yoke manner, etc.) fastening of the fifth casing 236 to the fourth housing panel 200 and/or the fifth housing panel 204 in only one orientation of the fifth casing 236 relative to the fourth housing panel 200 and/or the fifth housing panel 204.

In various embodiments, the third housing panel 146 also includes a third housing panel second conveyer aperture (e.g., hole, window, opening, etc.). The fifth casing 236 extends through the third housing panel second conveyer aperture. In this way, the third housing panel 146 supports the fifth casing 236 (e.g., relative to a frame that the third housing panel 146 is coupled to, etc.). In various embodiments, the fifth casing 236 is coupled to the third housing panel 146 (e.g., at least partially around the third housing panel first conveyer aperture 220, etc.).

The housing assembly 104 also includes a second exhaust gas provider conduit 244 (e.g., line, pipe, etc.). The second exhaust gas provider conduit 244 is coupled to the fifth casing 236 (e.g., downstream of the fourth aftertreatment component 210, etc.). The second exhaust gas provider conduit 244 is fluidly coupled to the fifth casing 236 and is configured to receive the exhaust gas from the fifth casing 236 (e.g., after the exhaust gas has been treated by the fourth aftertreatment component 210, etc.).

The outlet exhaust gas conduit 224 is coupled to the second exhaust gas provider conduit 244 and is configured to receive the exhaust gas from the second exhaust gas provider conduit 244.

In some embodiments, the dimensions of the exhaust gas aftertreatment system can be as follows. The volume in liters (L) of the first aftertreatment component substrate 122 may be in a range, inclusively, between 4.0 L-6.0 L (e.g., 4.1 L, 4.26 L, 4.85 L, etc.). The volume in liters of the second aftertreatment component substrate 160 may be in a range, inclusively, between 2.1 L-9.0 L (e.g., 2.1 L, 5.0 L, 8.5 L, etc.). The volume in liters of the third aftertreatment component substrate 168 may be in a range, inclusively, between 6.0 L-9.0 L (e.g., 6.0, 7.8. 8.0, etc.). The volume in liters of the fourth aftertreatment component substrate 218 may be in a range, inclusively, between 23.0 L-27.0 L (e.g., 23.5 L, 25.0 L, 25.22 L, etc.). The volume in liters of the fifth aftertreatment component substrate 242 may be in a range, inclusively, between 23.0 L-27.0 L (e.g., 23.5 L, 25.0 L, 25.22 L, etc.). However, other volumes (e.g., within 15% of the provided volumes, etc.) can also be used.

The diameter in millimeters (mm) of the first aftertreatment component substrate 122 may be in a range, inclusively, between 100 mm-300 mm (e.g., 100.5 mm, 266.7 mm, 280 mm, etc.). The diameter in millimeters of the second aftertreatment component substrate 160 may be in a range, inclusively, between 90 mm-280 mm (e.g., 100.5 mm, 266.7 mm, 270 mm, etc.). The diameter in millimeters of the third aftertreatment component substrate 168 may be in a range, inclusively, between 90 mm-280 mm (e.g., 100.5 mm, 266.7 mm, 270 mm, etc.). The diameter in millimeters of the fourth aftertreatment component substrate 218 may be in a range, inclusively, between 200 mm-300 mm (e.g., 211.1 mm, 226.0 mm, 240.5 mm, etc.). The diameter in millimeters of the fifth aftertreatment component substrate 242 may be in a range, inclusively, between 200 mm-300 mm (e.g., 211.1 mm, 226.0 mm, 240.5 mm, etc.). However, other diameters (e.g., within 15% of the provided diameters, etc.) can also be used.

The length in millimeters of the first aftertreatment component substrate 122 may be in a range, inclusively, between 50 mm-100 mm (e.g., 60.7 mm, 76.2 mm, 91.0 mm, etc.). The length in millimeters of the second aftertreatment component substrate 160 may be in a range, inclusively, between 100 mm-170 mm (e.g., 101.3 mm, 125.0 mm, 152.4 mm, etc.). The length in millimeters of the fourth aftertreatment component substrate 218 may be in a range, inclusively, between 100 mm-270 mm (e.g., 110.0 mm, 139.7 mm, 142.3 mm, 226 mm, etc.). The length in millimeters of the fifth aftertreatment component substrate 242 may be in a range, inclusively, between 100-270 mm (e.g., 110.0 mm, 139.7 mm, 142.3 mm, 226 mm, etc.). However, other lengths (e.g., within 15% of the provided lengths, etc.) can also be used.

As shown in FIG. 1, the exhaust gas aftertreatment system 100 is illustrated with the exhaust gas flow paths as arrows. For instance, the second portion of the exhaust gas is routed through the fifth casing 236 in parallel with the first portion of the exhaust gas which is routed through the fourth casing 212. By routing the second portion of the exhaust gas through the fifth casing 236 in parallel with the first portion of the exhaust gas which is routed through the fourth casing 212, treating the exhaust gas is more desirable than in other systems that do not facilitate routing of exhaust gas into multiple aftertreatment components in parallel. For example, the parallel routing of the exhaust gas may provide an increased capacity of the exhaust gas aftertreatment system 100 to treat exhaust gas and/or an increased efficiency of the exhaust gas aftertreatment system 100 in treating exhaust gas, when compared to other aftertreatment systems that do not facilitate routing of exhaust gas into multiple aftertreatment components in parallel.

While the exhaust gas aftertreatment system 100 has been shown and described in the context of use with a diesel internal combustion engine, it is understood that the exhaust gas aftertreatment system 100 may be used with other internal combustion engines, such as gasoline internal combustion engines, hybrid internal combustion engines, propane internal combustion engines, dual-fuel internal combustion engines, and other similar internal combustion engines.

III. CONFIGURATION OF EXAMPLE EMBODIMENTS

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, reductant, an air-reductant mixture, exhaust gas, hydrocarbon, an air-hydrocarbon mixture, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An exhaust gas aftertreatment system comprising:
   a first decomposition chamber configured to receive an exhaust gas;
   a first dosing module coupled to the first decomposition chamber and configured to provide a first treatment fluid into the first decomposition chamber;
   a first conversion catalyst member configured to receive a mixture of the first treatment fluid and the exhaust gas, from the first decomposition chamber;
   a second decomposition chamber configured to receive the exhaust gas from the first conversion catalyst member;
   a second dosing module coupled to the second decomposition chamber and configured to provide a second treatment fluid into the second decomposition chamber;
   a second conversion catalyst member configured to receive a first portion of a mixture of the second treatment fluid and the exhaust gas, from the second decomposition chamber;
   a third conversion catalyst member configured to receive a second portion of the mixture of the second treatment fluid and the exhaust gas, from the second decomposition chamber;
   an inlet exhaust gas conduit configured to provide the exhaust gas into the first decomposition chamber;
   a first housing panel that supports the inlet exhaust gas conduit and the second decomposition chamber;
   a second housing panel that supports the inlet exhaust gas conduit and the second decomposition chamber; and
   a third housing panel that supports the first decomposition chamber and the first conversion catalyst member.

2. The exhaust gas aftertreatment system of claim 1, further comprising a mixer configured to receive the first treatment fluid and the exhaust gas from the first decomposition chamber and mix the first treatment fluid and the exhaust gas upstream of the first conversion catalyst member.

3. The exhaust gas aftertreatment system of claim 2, wherein the mixer further comprises at least one of an upstream mixing plate, a downstream mixing plate, and a perforated plate.

4. The exhaust gas aftertreatment system of claim 1, further comprising a mixer configured to receive the second treatment fluid and the exhaust gas from the second decomposition chamber and mix the second treatment fluid and the exhaust gas upstream of the second conversion catalyst member and the third conversion catalyst member.

5. The exhaust gas aftertreatment system of claim 1, further comprising a fourth conversion catalyst member configured to provide the exhaust gas to the first decomposition chamber;
   wherein the first conversion catalyst member is a selective catalytic reduction (SCR) catalyst member; and
   wherein the fourth conversion catalyst member is an oxidation catalyst member.

6. The exhaust gas aftertreatment system of claim 1, further comprising an outlet exhaust gas conduit configured to receive the exhaust gas from the second conversion catalyst member and the third conversion catalyst member.

7. The exhaust gas aftertreatment system of claim 6, wherein the third housing panel supports the outlet exhaust gas conduit.

8. The exhaust gas aftertreatment system of claim 1, wherein at least one of the first dosing module and the second dosing module is configured to mix air with at least one of the first treatment fluid and the second treatment fluid.

9. The exhaust gas aftertreatment system of claim 8, further comprising at least one air filter configured to filter the air.

10. The exhaust gas aftertreatment system of claim 1, further comprising a heater positioned within the inlet exhaust gas conduit and configured to heat the exhaust gas.

11. The exhaust gas aftertreatment system of claim 1, further comprising at least one treatment fluid filter configured to filter at least one of the first treatment fluid and the second treatment fluid.

12. The exhaust gas aftertreatment system of claim 1, further comprising an exhaust gas filtration member configured to remove a particulate from the exhaust gas.

13. The exhaust gas aftertreatment system of claim 12, wherein the exhaust gas filtration member is selectively attachable to and detachable from the exhaust gas aftertreatment system.

14. The exhaust gas aftertreatment system of claim 1, further comprising:
   a first exhaust gas dividing conduit configured to receive the first portion of the mixture of the exhaust gas and the second treatment fluid, from the second decomposition chamber; and
   a second exhaust gas dividing conduit configured to receive the second portion of the mixture of the exhaust gas and the second treatment fluid, from the second decomposition chamber.

15. The exhaust gas aftertreatment system of claim 1, wherein the second dosing module is coupled to a treatment fluid pump coupled to the first dosing module, and uses the treatment fluid pump.

16. The exhaust gas aftertreatment system of claim 1, wherein at least one of the first conversion catalyst member, the second conversion catalyst member, and the third conversion catalyst member further comprises vanadium, platinum, rhodium, palladium, zinc, or copper.

17. The exhaust gas aftertreatment system of claim 1, wherein at least one of the first conversion catalyst member, the second conversion catalyst member, and the third conversion catalyst member is a ceramic conversion catalyst member.

18. The exhaust gas aftertreatment system of claim 1, further comprising:
   a first casing configured to receive the first portion of the mixture of the second treatment fluid and the exhaust gas, from the second conversion catalyst member; and
   a second casing configured to receive the second portion of the mixture of the second treatment fluid and the exhaust gas, from the third conversion catalyst member;
   wherein the first casing and the second casing are parallel to each other.

19. The exhaust gas aftertreatment system of claim 1, wherein the second conversion catalyst member treats the first portion of the mixture of the second treatment fluid and the exhaust gas simultaneously as the third conversion catalyst member treats the second portion of the mixture of the second treatment fluid and the exhaust gas.

20. The exhaust gas aftertreatment system of claim 1, wherein the first treatment fluid is different from the second treatment fluid.

21. The exhaust gas aftertreatment system of claim 1, wherein the first treatment fluid is the same as the second treatment fluid.

* * * * *